United States Patent
Zhang et al.

(10) Patent No.: US 12,009,694 B2
(45) Date of Patent: Jun. 11, 2024

(54) UNINTERRUPTIBLE POWER SUPPLY USING VACUUM CIRCUIT BREAKER

(71) Applicant: TMEIC Corporation, Tokyo (JP)

(72) Inventors: Xiaochen Zhang, Tokyo (JP); Yousuke Hayashi, Tokyo (JP)

(73) Assignee: TMEIC Corporation, Tokyo (JP)

( * ) Notice: Subject to any disclaimer, the term of this patent is extended or adjusted under 35 U.S.C. 154(b) by 0 days.

(21) Appl. No.: 17/784,070

(22) PCT Filed: Nov. 10, 2020

(86) PCT No.: PCT/JP2020/041930
§ 371 (c)(1),
(2) Date: Jun. 9, 2022

(87) PCT Pub. No.: WO2022/101985
PCT Pub. Date: May 19, 2022

(65) Prior Publication Data
US 2023/0039409 A1    Feb. 9, 2023

(51) Int. Cl.
*H02J 9/06* (2006.01)
*H02J 7/00* (2006.01)

(52) U.S. Cl.
CPC .......... *H02J 9/062* (2013.01); *H02J 7/0063* (2013.01); *H02J 9/068* (2020.01); *H02J 2207/20* (2020.01)

(58) Field of Classification Search
CPC ....... H02J 9/062; H02J 7/0063; H02J 2207/20
USPC ...................................................... 307/64, 66
See application file for complete search history.

(56) References Cited

U.S. PATENT DOCUMENTS

| | | | |
|---|---|---|---|
| 10,276,321 B2* | 4/2019 | Kennedy | H01H 9/54 |
| 10,825,625 B1* | 11/2020 | Marshall | H01H 33/6662 |
| 11,170,964 B2* | 11/2021 | Telefus | H01H 33/593 |
| 2014/0015324 A1* | 1/2014 | Brennan | H02J 3/381 |
| | | | 307/72 |

(Continued)

FOREIGN PATENT DOCUMENTS

| | | |
|---|---|---|
| CN | 102856137 A | 1/2013 |
| JP | 2009-136099 A | 6/2009 |
| JP | 2017-70046 A | 4/2017 |

OTHER PUBLICATIONS

International Search Report dated Jan. 12, 2021 in PCT/JP2020/041930 filed on Nov. 10, 2020 (citing reference AP, therein, 3 pages).

(Continued)

*Primary Examiner* — Michael R. Fin
(74) *Attorney, Agent, or Firm* — Oblon, McClelland, Maier & Neustadt, L.L.P.

(57) ABSTRACT

An uninterruptible power supply includes a plurality of vacuum circuit breakers and a bypass circuit connected in series between a commercial AC power supply and a load, a control device that turns on both of the plurality of vacuum circuit breakers and the bypass circuit when the commercial AC power supply is normal and turns off a vacuum circuit breaker different from a vacuum circuit breaker turned off on the occurrence of previous power failure of the plurality of vacuum circuit breakers and turns off the bypass circuit when the commercial AC power supply fails, and a power converter that converts DC power of a battery into AC power and supplies AC power to the load when the commercial AC power supply fails.

8 Claims, 9 Drawing Sheets

(56) References Cited

U.S. PATENT DOCUMENTS

2017/0004948 A1\* 1/2017 Leyh ..................... H01H 9/547
2017/0288388 A1\* 10/2017 Horinouchi ............. H01H 9/54

OTHER PUBLICATIONS

Indian Office Action issued Dec. 19, 2023, in Indian Patent Application No. 202217032363, 5 total pages.

\* cited by examiner

UNINTERRUPTIBLE POWER SUPPLY USING VACUUM CIRCUIT BREAKER

TECHNICAL FIELD

This invention relates to a power supply apparatus, and particularly to a power supply apparatus that supplies alternating-current (AC) power supplied from an AC power supply to a load when the AC power supply is normal, and converts direct-current (DC) power supplied from a DC power supply into AC power and supplies AC power to the load when the AC power supply fails.

BACKGROUND ART

For example, Japanese Patent Laying-Open No. 2009-136099 (PTL 1) discloses a power supply apparatus including an input terminal that receives AC power supplied from an AC power supply, an output terminal connected to a load, a bypass circuit connected between the input terminal and the output terminal, the bypass circuit being turned on when the AC power supply is normal and turned off when the AC power supply fails, and a power converter that converts DC power supplied from a DC power supply into AC power and provides AC power to the output terminal when the AC power supply fails.

In addition, for example, Japanese Patent Laying-Open No. 2017-70046 (PTL 2) discloses a power supply apparatus including an input terminal that receives AC power supplied from an AC power supply, an output terminal connected to a load, a mechanical switch and a bypass circuit connected in series between the input terminal and the output terminal, a control device that turns on both of the mechanical switch and the bypass circuit when the AC power supply is normal, turns off the bypass circuit when the AC power supply fails, counts the number of times that an AC voltage of the input terminal becomes lower than a lower limit value, and determines that the bypass circuit has failed due to short-circuiting and turns off the mechanical switch when a count value within a prescribed time period exceeds a prescribed value, and a power converter that converts DC power supplied from a DC power supply into AC power and supplies AC power to the load when the AC power supply fails.

CITATION LIST

Patent Literature

PTL 1: Japanese Patent Laying-Open No. 2009-136099
PTL 2: Japanese Patent Laying-Open No. 2017-70046

SUMMARY OF INVENTION

Technical Problem

In PTL 1, however, the bypass circuit is composed of a pair of thyristors connected in anti-parallel to each other, and the thyristors are not turned off until a current that flows through the thyristors attains to 0 A. Therefore, when the AC power supply fails, it takes time to disconnect the AC power supply and the load from each other.

In order to address this, the bypass circuit may be composed of a semiconductor switch including an insulated gate bipolar transistor (IGBT) and a diode. Since this semiconductor switch operates faster than the thyristor, it can quickly disconnect the AC power supply and the load from each other on the occurrence of power failure of the AC power supply.

This semiconductor switch, however, is vulnerable to a surge voltage. Therefore, a snubber circuit that suppress a surge voltage generated at the time of turn-off of the semiconductor switch should be connected in parallel to the semiconductor switch. The snubber circuit includes, for example, a resistive element and a capacitor connected in series, and transmits an AC voltage.

Therefore, when the AC power supply fails, an AC output voltage of the power converter is transmitted to the input terminal through the snubber circuit, which leads to erroneous determination as recovery of the AC power supply. When recovery of the AC power supply is detected, output of AC power from the power converter is stopped, which leads to determination as occurrence again of power failure of the AC power supply and resumption of output of AC power from the power converter. Therefore, output and stop of AC power from the power converter are repeated, and a malfunction of the power supply apparatus occurs.

Then, a method of connecting the mechanical switch and the bypass circuit in series between the input terminal and the output terminal and turning off the mechanical switch and the bypass circuit on the occurrence of power failure of the AC power supply may be available. According to this method, an AC output voltage of the power converter can be prevented from being transmitted to the input terminal through the snubber circuit on the occurrence of power failure of the AC power supply and the malfunction of the power supply apparatus can be prevented.

Since use of a high-speed mechanical switch leads to increase in cost, a vacuum circuit breaker inexpensive as the mechanical switch is desirably used. In order to turn on the vacuum circuit breaker in an off state, however, energy storage in a spring by an energy storage motor should be completed. Therefore, turn-on and turn-off of the vacuum circuit breaker cannot be repeated within a short period of time. Accordingly, when the vacuum circuit breaker is employed as the mechanical switch, the operation may not be normal in the event of power failure and recovery of the AC power supply repeated within a short period of time.

Therefore, a primary object of this invention is to provide a power supply apparatus that is inexpensive and operates fast in a stable manner.

Solution to Problem

A power supply apparatus according to this invention includes an input terminal that receives AC power supplied from an AC power supply, an output terminal connected to a load, a plurality of mechanical switches and a bypass circuit connected in series between the input terminal and the output terminal, a control device that turns on both of the plurality of mechanical switches and the bypass circuit when the AC power supply is normal, and turns off a mechanical switch different from a mechanical switch turned off on the occurrence of previous power failure of the plurality of mechanical switches and turns off the bypass circuit when the AC power supply fails, and a power converter that converts DC power supplied from a DC power supply into AC power and provides AC power to the output terminal when the AC power supply fails.

Advantageous Effects of Invention

In the power supply apparatus according to this invention, a plurality of mechanical switches are connected in series between the input terminal and one terminal of the bypass circuit. When the AC power supply is normal, the plurality of mechanical switches are all turned on, and when the AC power supply fails, a mechanical switch different from a mechanical switch turned off on the occurrence of previous power failure of the plurality of mechanical switches is turned off.

Therefore, even when the bypass circuit is composed of the semiconductor switch and the snubber circuit connected in parallel, an AC output voltage of the power converter can be prevented from appearing at the input terminal through the bypass circuit on the occurrence of power failure of the AC power supply and a malfunction of the power supply apparatus can be prevented.

Even in an example where the vacuum circuit breaker inexpensive as the mechanical switch is employed, rather than a vacuum circuit breaker turned off and on on the occurrence of previous power failure and recovery, a vacuum circuit breaker in which energy has already been stored in a spring is turned off. Therefore, when the AC power supply recovers, the plurality of mechanical switches can quickly be turned on. Thus, the power supply apparatus that is inexpensive and operates fast in a stable manner can be realized.

DESCRIPTION OF EMBODIMENTS

Figure 1:
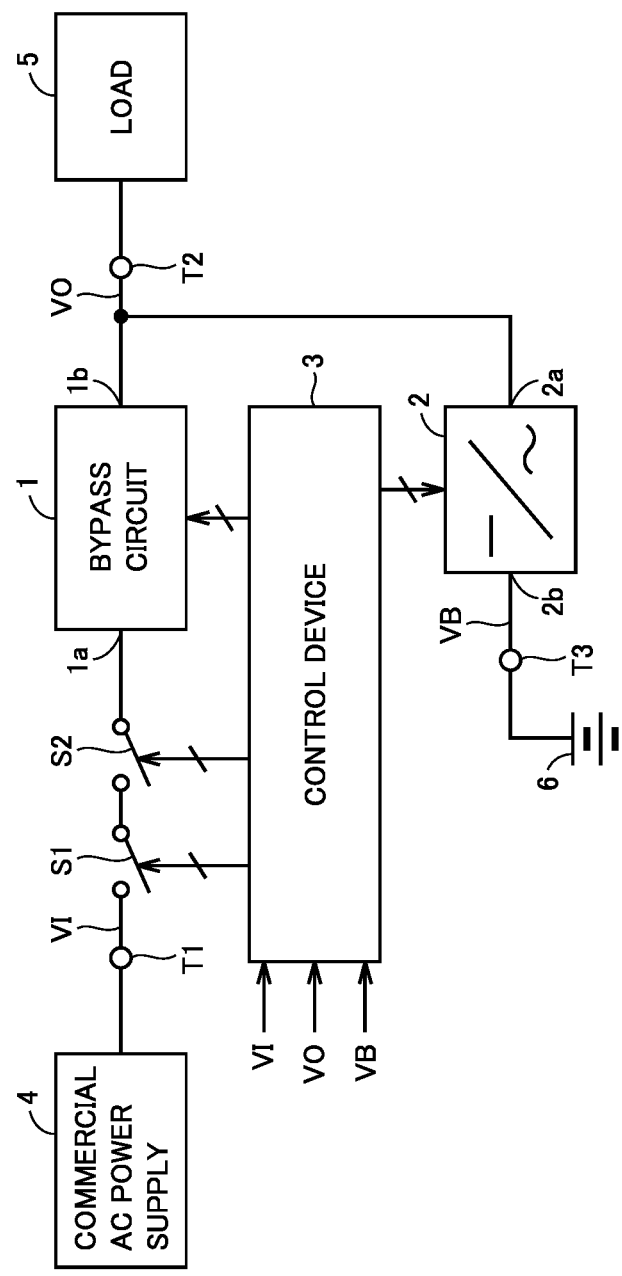
FIG. 1 is a circuit block diagram showing a configuration of an uninterruptible power supply according to one embodiment of this invention.

FIG. 1 is a circuit block diagram showing a configuration of an uninterruptible power supply according to one embodiment of this invention. In FIG. 1, this uninterruptible power supply includes an input terminal T1, an output terminal T2, a battery terminal T3, a plurality of (two in FIG. 1) vacuum circuit breakers (mechanical switches) S1 and S2, a bypass circuit 1, a power converter 2, and a control device 3.

Input terminal T1 receives an AC voltage VI at a commercial frequency supplied from a commercial AC power supply 4. Control device 3 detects an instantaneous value of AC voltage VI. Control device 3 detects power failure and recovery of commercial AC power supply 4 based on a detection value of AC voltage VI.

Output terminal T2 is connected to a load 5. Load 5 is driven by an AC voltage VO supplied from output terminal T2 of the uninterruptible power supply. Control device 3 detects an instantaneous value of AC voltage VO.

Battery terminal T3 is connected to a battery 6 (a DC power supply or a power storage device). DC power is stored in battery 6. A capacitor may be connected instead of battery 6. Control device 3 detects an instantaneous value of a DC voltage VB (a voltage across terminals of battery 6) of battery terminal T3.

Vacuum circuit breakers S1 and S2 are connected in series between input terminal T1 and one terminal 1a of bypass circuit 1. Control device 3 controls each of vacuum circuit breakers S1 and S2. When AC voltage VI supplied from commercial AC power supply 4 is within a normal range (when commercial AC power supply 4 is normal), vacuum circuit breakers S1 and S2 are both turned on.

When AC voltage VI supplied from commercial AC power supply 4 is not within the normal range (when commercial AC power supply 4 fails), a vacuum circuit breaker (S2 in this case) different from a vacuum circuit breaker (for example, S1) turned off and on on the occurrence of previous power failure and recovery of vacuum circuit breakers S1 and S2 is turned off. Reasons will be described in detail later.

Bypass circuit 1 has the other terminal 1b connected to output terminal T2. Control device 3 controls bypass circuit 1. When commercial AC power supply 4 is normal, bypass circuit 1 is turned on. When commercial AC power supply 4 fails, bypass circuit 1 is turned off.

Power converter 2 has an AC terminal 2a connected to output terminal T2 and has a DC terminal 2b connected to battery terminal T3. Control device 3 controls power converter 2. When commercial AC power supply 4 is normal, power converter 2 converts AC power supplied from commercial AC power supply 4 through vacuum circuit breakers S1 and S2 and bypass circuit 1 into DC power and has DC power stored in battery 6. At this time, control device 3 controls power converter 2 such that voltage VB across terminals of battery 6 attains to a reference voltage VBR.

When commercial AC power supply 4 fails, power converter 2 converts DC power of battery 6 into AC power at the commercial frequency and supplies AC power to load 5. At this time, control device 3 controls power converter 2 such that AC voltage VO of output terminal T2 attains to a reference AC voltage VOR. Control device 3 stops operations of power converter 2 when voltage VB across terminals of battery 6 attains to a lower limit voltage.

An operation of this uninterruptible power supply will now briefly be described. When commercial AC power supply 4 is normal, vacuum circuit breakers S1 and S2 and bypass circuit 1 are all turned on, so that AC power is supplied from commercial AC power supply 4 through vacuum circuit breakers S1 and S2 and bypass circuit 1 to load 5 and load 5 operates.

AC power is supplied from commercial AC power supply 4 through vacuum circuit breakers S1 and S2 and bypass circuit 1 to power converter 2, which converts AC power into DC power, and DC power is stored in battery 6.

When commercial AC power supply 4 fails, the vacuum circuit breaker (S1 in this case) different from the vacuum circuit breaker (for example, S2) turned off on the occurrence of previous power failure is turned off and bypass circuit 1 is turned off, to thereby disconnect commercial AC power supply 4 and load 5 from each other. Power converter 2 converts DC power of battery 6 into AC power and supplies AC power to load 5, so that the operation of load 5 continues.

When commercial AC power supply 4 recovers, vacuum circuit breakers S1 and S2 and bypass circuit 1 are all turned on, so that AC power is supplied from commercial AC power supply 4 through vacuum circuit breakers S1 and S2 and bypass circuit 1 to load 5 and load 5 operates.

AC power is supplied from commercial AC power supply 4 through vacuum circuit breakers S1 and S2 and bypass circuit 1 to power converter 2, which converts AC power into DC power, and DC power is stored in battery 6.

When commercial AC power supply 4 fails again, vacuum circuit breaker S2 different from vacuum circuit breaker S1 turned off on the occurrence of previous power failure is turned off and bypass circuit 1 is turned off, to thereby disconnect commercial AC power supply 4 and load 5 from each other. Power converter 2 converts DC power of battery 6 into AC power and supplies AC power to load 5, so that the operation of load 5 continues.

Reasons why two vacuum circuit breakers S1 and S2 are connected in series and the vacuum circuit breaker different from the vacuum circuit breaker turned off on the occurrence of previous power failure is turned off when commercial AC power supply 4 fails will now be described in detail.

Figure 2:
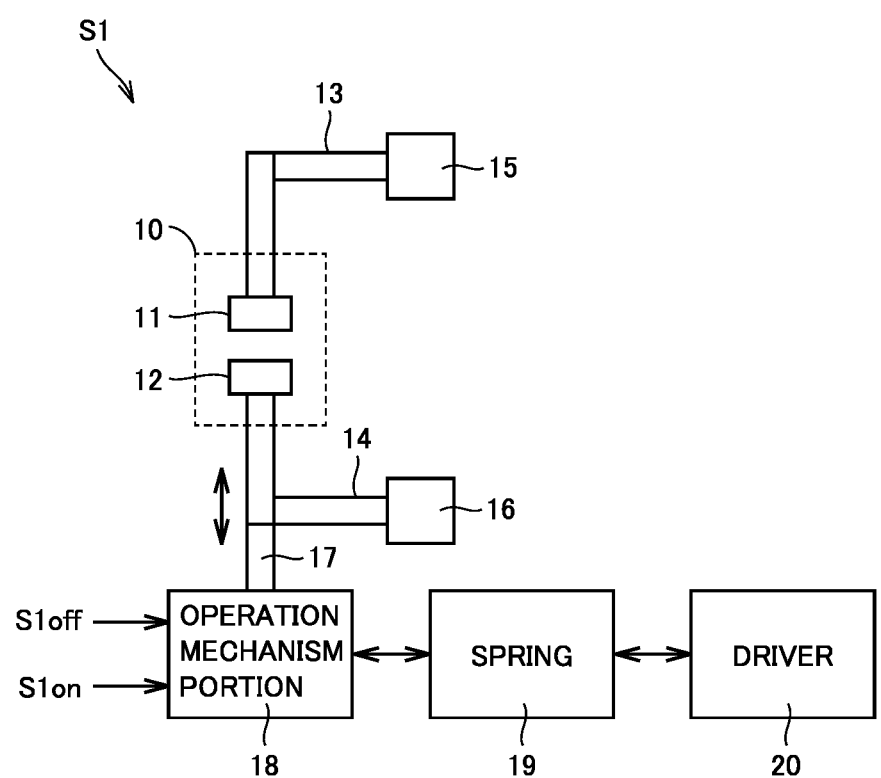
FIG. 2 is a block diagram showing a configuration of a vacuum circuit breaker shown in FIG. 1.

FIG. 2 is a block diagram showing a configuration of vacuum circuit breaker S1. In FIG. 2, vacuum circuit breaker S1 includes a vacuum valve 10, conductors 13 and 14, external terminals 15 and 16, an operation rod 17, an operation mechanism portion 18, a spring 19, and a driver 20.

Vacuum valve 10 includes a pair of electrodes 11 and 12. Electrodes 11 and 12 have tip ends provided within vacuum valve 10 and arranged as being opposed to each other. Electrodes 11 and 12 have rear ends exposed to the outside of vacuum valve 10. Electrode 11 is fixed to an upper end of vacuum valve 10 and electrode 12 is supported at a lower end of vacuum valve 10 as being vertically movable.

Electrode 11 has the rear end connected to external terminal 15 through conductor 13. Electrode 12 has the rear end connected to external terminal 16 through conductor 14 and coupled to operation mechanism portion 18 with operation rod 17 being interposed. Operation rod 17 is formed of an insulating material.

Driver 20 includes an energy storage motor and a cam, and has energy stored in spring 19. Operation mechanism portion 18 moves operation rod 17 downward in response to an off command signal S1 off from control device 3. When operation rod 17 moves downward, electrode 12 moves downward, the tip ends of electrodes 11 and 12 move away from each other, external terminals 15 and 16 are not conducting to each other, and vacuum circuit breaker S1 is turned off.

When energy has been stored in spring 19, operation mechanism portion 18 releases energy in spring 19 in response to an on command signal S1 on from control device 3 and moves operation rod 17 upward by using release force of spring 19. When operation rod 17 moves upward, electrode 12 moves upward, the tip ends of electrodes 11 and 12 come in contact with each other, external terminals 15 and 16 are conducting to each other, and vacuum circuit breaker S1 is turned on. When energy stored in spring 19 is released, driver 20 immediately has energy stored in spring 19.

Figure 3:
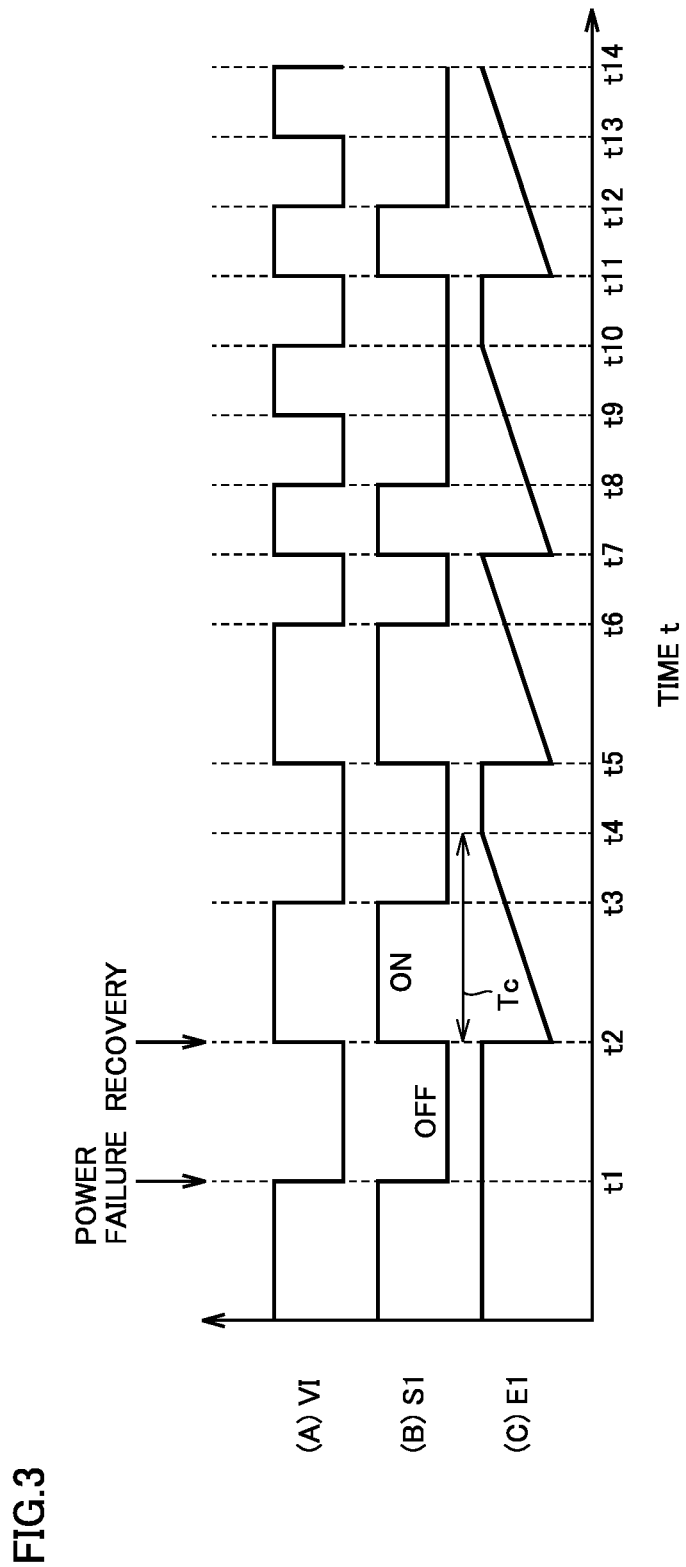
FIG. 3 is a time chart for illustrating a problem of the vacuum circuit breaker shown in FIG. 2.

FIG. 3 is a time chart showing an operation of vacuum circuit breaker S1 when only a single vacuum circuit breaker S1 is connected between input terminal T1 and one terminal 1a of bypass circuit 1. In FIG. 3, (A) shows an effective value of AC voltage VI supplied from commercial AC power supply 4, (B) shows on and off states of vacuum circuit breaker S1, and (C) shows energy E1 in spring 19.

For simplification of the drawings and the description, it is assumed here that AC terminal 2a of power converter 2 has been disconnected from output terminal T2. Therefore, AC output voltage VO of power converter 2 does not appear at one terminal 1a of bypass circuit 1 when commercial AC power supply 4 fails.

FIG. 3 shows an example in which power failure and recovery of commercial AC power supply 4 are repeated. When commercial AC power supply 4 is normal, AC voltage VI is at a large value, and when commercial AC power supply 4 fails, AC voltage VI is at a small value.

It is assumed that, in an initial state, commercial AC power supply 4 is normal, vacuum circuit breaker S1 is on, energy storage in spring 19 has been completed, and energy E1 in spring 19 is maintained at a large value. In turning off vacuum circuit breaker S1 (time t1, t3, ... ), spring 19 is not used and energy E1 in spring 19 does not vary. In turning on vacuum circuit breaker S1 (time t2, t5, ... ), energy in spring 19 is released and decreases from the large value to the small value.

As energy in spring 19 is released, driver 20 (FIG. 2) immediately has energy stored in spring 19. As energy storage in spring 19 is started, energy E1 in spring 19 gradually increases. In order to increase energy E1 in spring 19 from the small value to the large value, a prescribed time period Tc is required.

As shown in FIG. 3, when a time period from recovery to power failure and to recovery again is longer than prescribed time period Tc (for example, time t2 to t5), energy storage in spring 19 has been completed before recovery at t5, and hence vacuum circuit breaker S1 can be turned on at time t5 of recovery.

When the time period from recovery to power failure and to recovery again is shorter than prescribed time period Tc (for example, time t7 to t9), however, energy storage in spring 19 has not yet been completed at time t9 of recovery, and hence vacuum circuit breaker S1 cannot be turned on at the time of recovery at t9.

Therefore, a configuration in which only a single vacuum circuit breaker S1 is connected between input terminal T1 and one terminal 1a of bypass circuit 1 cannot address repeated power failure and recovery of commercial AC power supply 4 within a short period of time.

Figure 4:
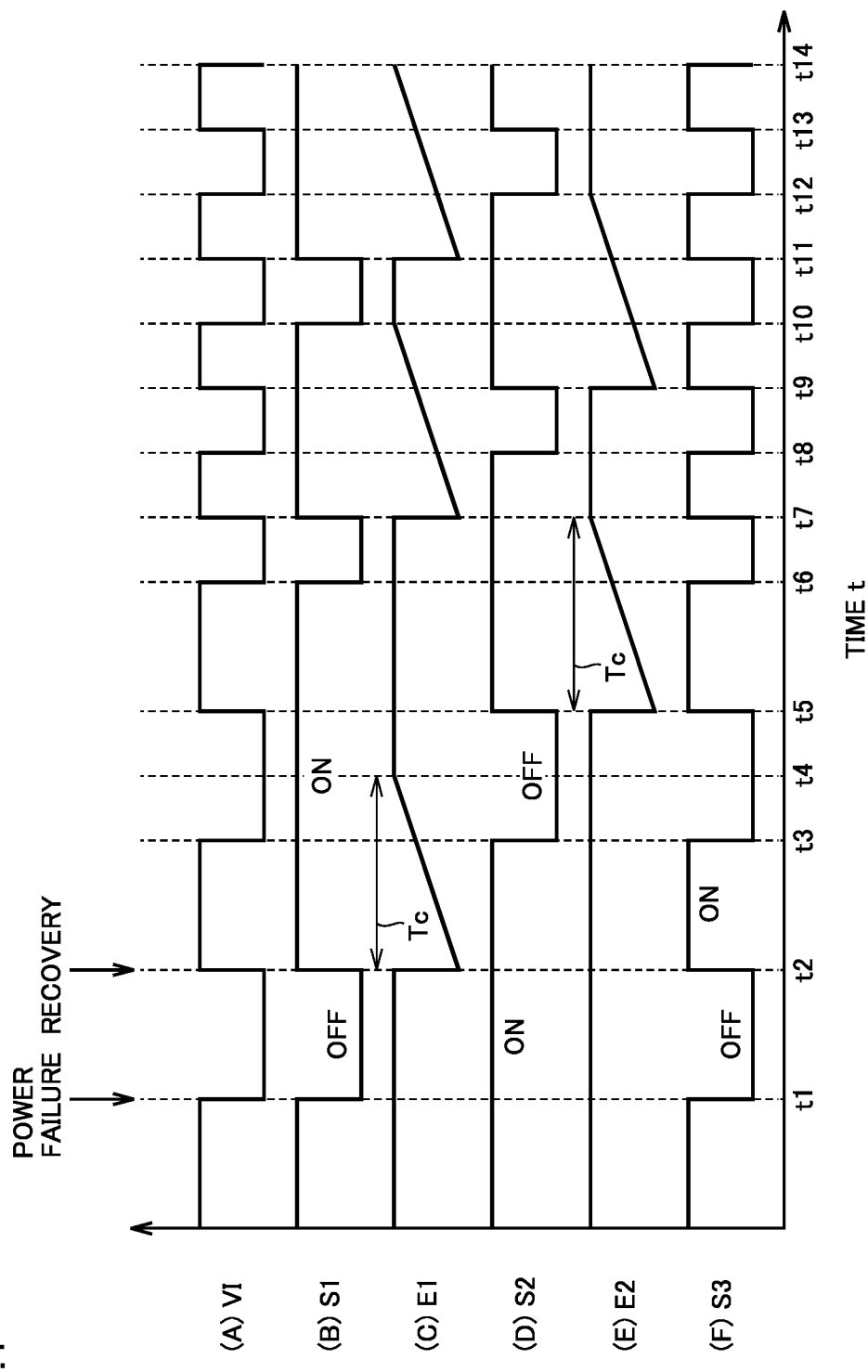
FIG. 4 is a time chart for illustrating an effect of the invention in the present application.

FIG. 4 is a time chart that illustrates operations of vacuum circuit breakers S1 and S2 in an example in which two vacuum circuit breakers S1 and S2 are connected between input terminal T1 and one terminal 1a of bypass circuit 1. In FIG. 4, (A) shows an effective value of AC voltage VI supplied from commercial AC power supply 4, (B) shows on and off states of vacuum circuit breaker S1, (C) shows energy E1 in spring 19 of vacuum circuit breaker S1, (D) shows on and off states of vacuum circuit breaker S2, (E) shows energy E2 in spring 19 of vacuum circuit breaker S2, and (F) shows on and off states of one mechanical switch S3 composed of two vacuum circuit breakers S1 and S2 connected in series.

As in FIG. 3, for simplification of the drawings and description, it is assumed that AC terminal 2a of power converter 2 is disconnected from output terminal T2. Therefore, AC output voltage VO of power converter 2 does not appear at one terminal 1a of bypass circuit 1 when commercial AC power supply 4 fails.

FIG. 4 shows an example in which power failure and recovery of commercial AC power supply 4 are repeated at timing the same as in FIG. 3. When commercial AC power supply 4 is normal, AC voltage VI is at a large value, and when commercial AC power supply 4 fails, AC voltage VI is at a small value.

It is assumed that, in the initial state, commercial AC power supply 4 is normal, vacuum circuit breakers S1 and S2 are both turned on, energy E1 and energy E2 in springs 19 in vacuum circuit breakers S1 and S2 are at large values, and mechanical switch S3 is turned on.

When commercial AC power supply 4 fails at certain time t1, vacuum circuit breaker S1 different from previously turned-off vacuum circuit breaker S2 of vacuum circuit breakers S1 and S2 is turned off and mechanical switch S3 is turned off.

When commercial AC power supply 4 recovers at time t2, energy in spring 19 of vacuum circuit breaker S1 is released, vacuum circuit breaker S1 is turned on, and mechanical switch S3 is turned on. As energy in spring 19 of vacuum circuit breaker S1 is released, energy storage in that spring 19 is immediately started, and energy E1 in that spring 19 gradually increases. Energy E1 in spring 19 is at a large value at time t4 after lapse of prescribed time period Tc since time t2, and energy storage in spring 19 of vacuum circuit breaker S1 is completed.

When commercial AC power supply 4 fails again at time t3, vacuum circuit breaker S2 different from previously turned-off vacuum circuit breaker S1 of vacuum circuit breakers S1 and S2 is turned off and mechanical switch S3 is turned off.

When commercial AC power supply 4 recovers again at time t5, energy in spring 19 of vacuum circuit breaker S2 is released, so that vacuum circuit breaker S2 is turned on and mechanical switch S3 is turned on. As energy in spring 19 of vacuum circuit breaker S2 is released, energy storage in that spring 19 is immediately started and energy E2 in that spring 19 gradually increases. Energy E2 in spring 19 is at a large value at time t7 after lapse of prescribed time period Tc since time t5, and energy storage in spring 19 of vacuum circuit breaker S2 is completed.

As shown in FIG. 4, in the present embodiment, one vacuum circuit breaker (for example, S1) is turned off and on, and the other vacuum circuit breaker (S2 in this example) is turned off and on while energy is being stored in spring 19 of vacuum circuit breaker S1 (for example, from time t6 to t10). Therefore, even when a time period from recovery to power failure and to recovery again is shorter than prescribed time period Tc (for example, time t7 to t9), vacuum circuit breaker S2 can be turned on at the time of recovery at t9.

Therefore, when power failure and recovery of commercial AC power supply 4 are repeated within a short period of time as shown in FIG. 4, mechanical switch S3 can be turned off at the time of power failure and turned on at the time of recovery, so that mechanical switch S3 (that is, vacuum circuit breakers S1 and S2) can normally operate.

Figure 5:
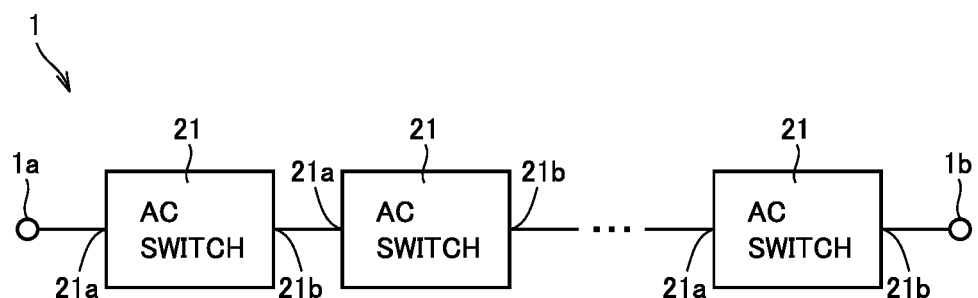
FIG. 5 is a block diagram showing a configuration of a bypass circuit shown in FIG. 1.

FIG. 5 is a block diagram showing a configuration of bypass circuit 1. In FIG. 5, bypass circuit 1 includes AC switches 21 in a plurality of stages connected in series between one terminal 1a and the other terminal 1b. AC switch 21 in a first stage has one terminal 21a connected to one terminal 1a of bypass circuit 1. Each AC switch 21 in a second stage or subsequent stage has one terminal 21a connected to the other terminal 21b of AC switch 21 in a previous stage and has the other terminal 21b connected to one terminal 21a of AC switch 21 in a subsequent stage. AC switch 21 in a final stage has the other terminal 21b connected to the other terminal 1b of bypass circuit 1, that is, output terminal T2 (FIG. 1).

Control device 3 controls the plurality of AC switches 21. When commercial AC power supply 4 is normal, the plurality of AC switches 21 are all turned on and bypass circuit 1 is turned on. When commercial AC power supply 4 fails, the plurality of AC switches 21 are all turned off and bypass circuit 1 is turned off.

Figure 6:
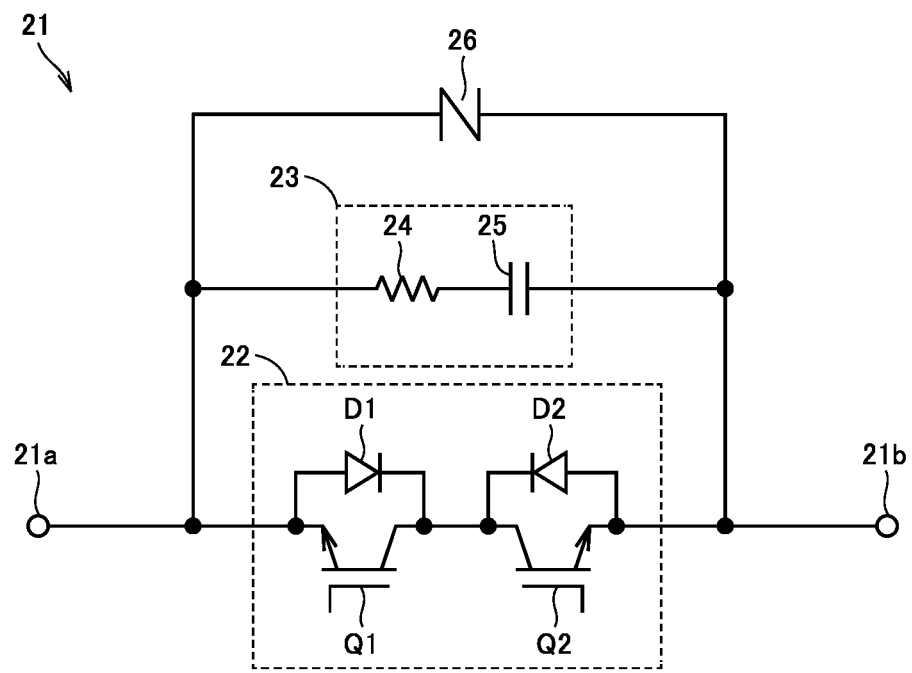
FIG. 6 is a circuit diagram showing a configuration of an AC switch shown in FIG. 5.

FIG. 6 is a circuit diagram showing a configuration of AC switch 21. In FIG. 6, AC switch 21 includes a semiconductor switch 22, a snubber circuit 23, and a varistor 26 connected in parallel between one terminal 21a and the other terminal 21b.

Semiconductor switch 22 includes IGBTs Q1 and Q2 and diodes D1 and D2. IGBTs Q1 and Q2 have collectors connected to each other and emitters connected to terminals 21a and 21b, respectively. Diodes D1 and D2 are connected in anti-parallel to IGBTs Q1 and Q2, respectively. Control device 3 controls on and off of each of IGBTs Q1 and Q2.

When commercial AC power supply 4 is normal, while AC voltage VI supplied from commercial AC power supply 4 is positive, IGBTs Q1 and Q2 have gates set to the "L" level and the "H" level, respectively. IGBTs Q1 and Q2 are thus in the off state and the on state, respectively, and a current flows from one terminal 21a through diode D1 and IGBT Q2 to the other terminal 21b.

When commercial AC power supply 4 is normal, while AC voltage VI supplied from commercial AC power supply 4 is negative, IGBTs Q1 and Q2 have the gates set to the "H" level and the "L" level, respectively. IGBTs Q1 and Q2 are thus in the on state and the off state, respectively, and a current flows from the other terminal 21b through diode D2 and IGBT Q1 to one terminal 21a. Therefore, when commercial AC power supply 4 is normal, semiconductor switch 22 is turned on.

When commercial AC power supply 4 fails, IGBTs Q1 and Q2 have the gates both set to the "L" level and IGBTs Q1 and Q2 are both turned off. Therefore, when commercial AC power supply 4 fails, semiconductor switch 22 is turned off.

As described in PTL 1, a method of composing the bypass circuit of the pair of thyristors connected in anti-parallel to each other is also available. With this method, however, the thyristors are not turned off until the current that flows through the thyristors attains to 0 A, and a time period for disconnection of the bypass circuit is longer.

In contrast, in the present embodiment, bypass circuit 1 is composed of semiconductor switch 22 including IGBTs Q1 and Q2 and diodes D1 and D2. Therefore, the time period for disconnection of bypass circuit 1 can be short. This semiconductor switch 22, however, is disadvantageous in being more vulnerable to a surge voltage than the thyristors. Then, in the present embodiment, each of snubber circuit 23 and varistor 26 is connected in parallel to semiconductor switch 22.

Snubber circuit 23 includes a resistive element 24 and a capacitor 25 connected in series between terminals 21a and 21b. When semiconductor switch 22 is suddenly turned off while a current flows through semiconductor switch 22, a surge voltage is produced across terminals 21a and 21b due to a self-inductance. Snubber circuit 23 protects semiconductor switch 22 by suppressing such a surge voltage.

Varistor 26 is connected between terminals 21a and 21b. When a voltage across terminals 21a and 21b is lower than a threshold voltage, a resistance value of varistor 26 is large. When the voltage across terminals 21a and 21b exceeds the threshold voltage, the resistance value of varistor 26 is small. Therefore, the voltage across terminals 21a and 21b can be prevented from exceeding the threshold voltage and semiconductor switch 22 can be prevented from being broken by the surge voltage.

Therefore, in the present embodiment, since bypass circuit 1 is composed of semiconductor switch 22 including IGBTs Q1 and Q2 and diodes D1 and D2, bypass circuit 1 can be turned off more quickly and commercial AC power supply 4 and load 5 can be disconnected from each other in a shorter period of time on the occurrence of power failure of commercial AC power supply 4 than in an example in which the bypass circuit is composed of a pair of thyristors. Since each of snubber circuit 23 and varistor 26 is connected in parallel to semiconductor switch 22, semiconductor switch 22 can be prevented from being broken by the surge voltage.

Snubber circuit 23 including resistive element 24 and capacitor 25 connected in series, however, transmits an AC voltage. Therefore, even when semiconductor switch 22 is turned off on the occurrence of power failure of commercial AC power supply 4, AC voltage VO generated by power converter 2 (FIG. 1) is transmitted to one terminal 1a of bypass circuit 1 through snubber circuits 23 in a plurality of stages.

Since a time period for disconnection of vacuum circuit breakers S1 and S2 is longer than a time period for disconnection of semiconductor switch 22, AC voltage VO generated by power converter 2 is transmitted to input terminal T1 through snubber circuits 23 in the plurality of stages and vacuum circuit breakers S1 and S2 when vacuum circuit breaker S1 or S2 has not yet been turned off.

In this case, in spite of the fact that commercial AC power supply 4 has actually failed, determination that commercial AC power supply 4 has recovered may be made based on AC voltage VI of input terminal T1, and vacuum circuit breakers S1 and S2 and bypass circuit 1 may be turned on and a DC-AC conversion operation by power converter 2 may be stopped. When the DC-AC conversion operation by power converter 2 is stopped, output of AC voltage VO from power converter 2 is stopped and determination that power failure of commercial AC power supply 4 has occurred again is made.

Therefore, output and stop of AC voltage VO from power converter 2 are repeated and load 5 cannot normally operate. Then, in the present embodiment, control device 3 determines whether or not commercial AC power supply 4 has recovered after lapse of a prescribed time period Td since occurrence of power failure of commercial AC power supply 4. Prescribed time period Td is set to a time period longer than a time period for disconnection required for turning off each of vacuum circuit breakers S1 and S2. A configuration for realizing such a recovery detection method will now be described.

Figure 7:
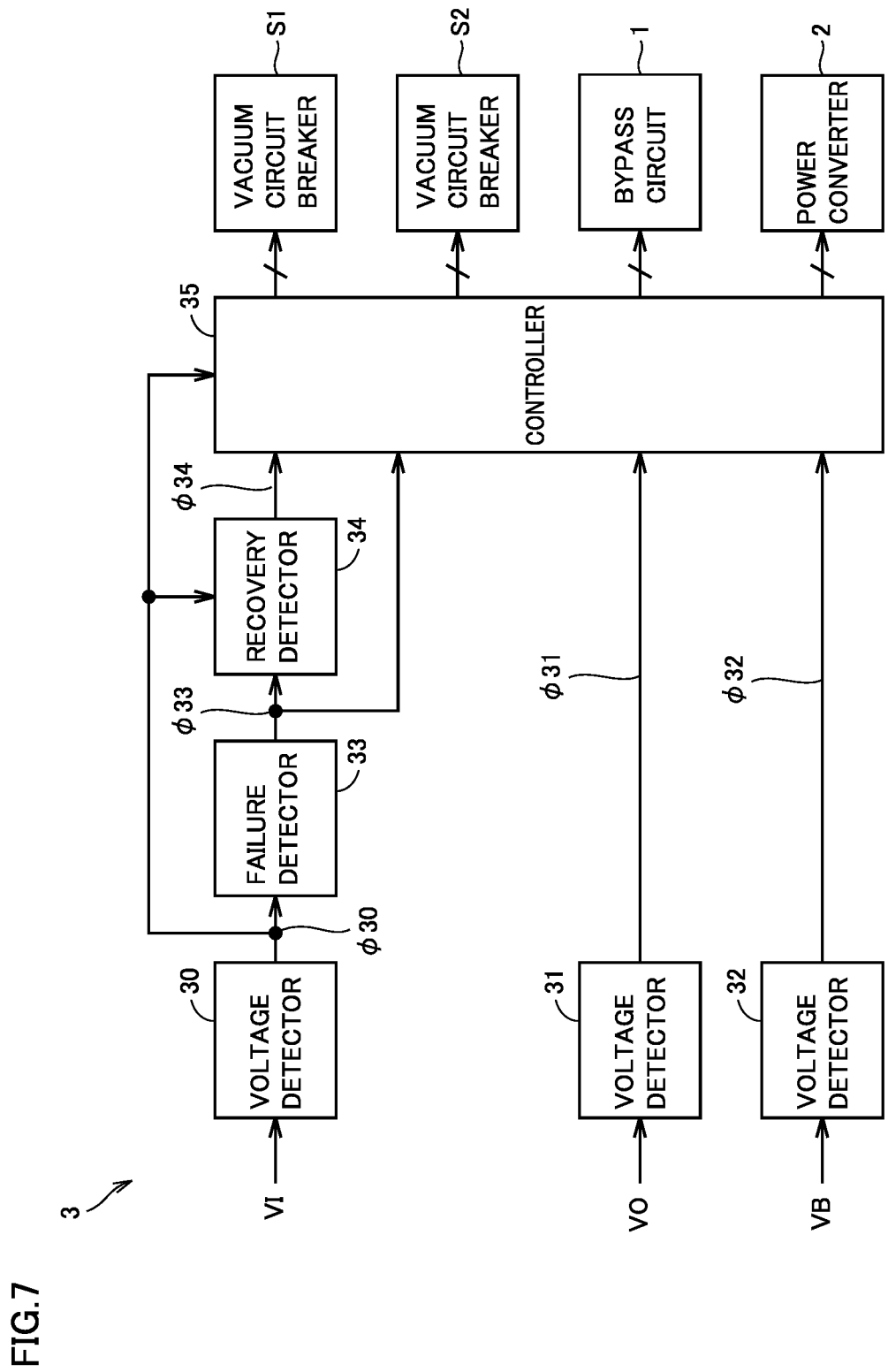
FIG. 7 is a block diagram showing a configuration of a control device shown in FIG. 1.

FIG. 7 is a block diagram showing a configuration of control device 3. In FIG. 7, control device 3 includes voltage detectors 30 to 32, a failure detector 33, a recovery detector 34, and a controller 35. Voltage detector 30 detects an instantaneous value of AC voltage VI of input terminal T1 and provides a signal φ30 indicating a detection value thereof. Voltage detector 31 detects an instantaneous value of AC voltage VO of output terminal T2 and provides a signal φ31 indicating a detection value thereof. Voltage detector 32 detects an instantaneous value of DC voltage VB of battery terminal T3 and provides a signal φ32 indicating a detection value thereof.

Failure detector 33 compares magnitude between an effective value of AC voltage VI indicated by output signal φ30 from voltage detector 30 and a lower limit value and provides a failure detection signal φ33 based on a result of comparison. When the effective value of AC voltage VI is larger than the lower limit value, failure detection signal φ33 is set to the "H" level which is a non-activated level. When the effective value of AC voltage VI becomes smaller than the lower limit value, failure detection signal φ33 is set to the "L" level which is an activated level.

Recovery detector 34 compares magnitude between the effective value of AC voltage VI indicated by output signal φ30 from voltage detector 30 and the lower limit value after lapse of prescribed time period Td since falling of failure detection signal φ33 from the "H" level to the "L" level, and provides a recovery detection signal φ34 based on a result of comparison. When the effective value of AC voltage VI is smaller than the lower limit value, recovery detection signal φ34 is set to the "L" level which is the non-activated level. When the effective value of AC voltage VI becomes larger than the lower limit value, recovery detection signal φ34 is set to the "H" level which is the activated level.

Controller 35 controls vacuum circuit breakers S1 and S2, bypass circuit 1, and power converter 2 based on output signals φ30 to φ32 from voltage detectors 30 to 32, failure detection signal φ33, and recovery detection signal φ34.

Figure 8:
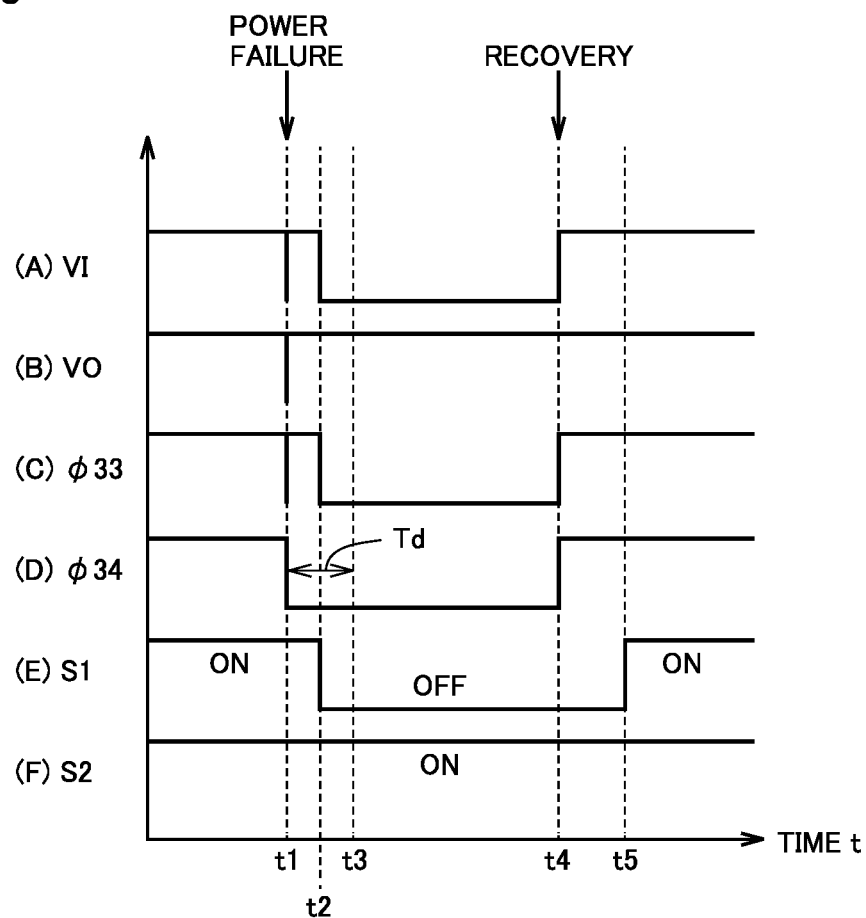
FIG. 8 is a time chart showing an operation of the control device shown in FIG. 7.

FIG. 8 is a time chart showing an operation of control device 3 shown in FIG. 7. In FIG. 8, (A) shows the effective value of AC voltage VI of input terminal T1, (B) shows the effective value of AC voltage VO of output terminal T2, (C) shows a waveform of failure detection signal φ33, (D) shows a waveform of recovery detection signal φ34, (E) shows on and off states of vacuum circuit breaker S1, and (F) shows on and off states of vacuum circuit breaker S2.

In FIG. 8, in the initial state, it is assumed that commercial AC power supply 4 is normal and vacuum circuit breakers S1 and S2 and bypass circuit 1 are turned on. At this time, AC voltage VI is supplied from commercial AC power supply 4 through vacuum circuit breakers S1 and S2 and bypass circuit 1 to output terminal T2 and AC voltages VI and VO are both at large values. Failure detection signal φ33 is set to the "H" level which is the non-activated level and recovery detection signal φ34 is set to the "H" level which is the activated level.

When commercial AC power supply 4 fails at certain time t1, AC voltages VI and VO lower to small values, failure detection signal φ33 is set to the "L" level which is the activated level, and recovery detection signal φ34 is set to the "L" level which is the non-activated level.

When failure detection signal φ33 is set to the "L" level which is the activated level, controller 35 turns off each semiconductor switch 22 of bypass circuit 1, provides off command signal S1 off (FIG. 2) to vacuum circuit breaker S1 different from the previously turned-off vacuum circuit breaker (which is assumed as S2), and controls power converter 2 to perform the DC-AC conversion operation. Vacuum circuit breaker S1 starts a disconnection operation in response to off command signal S1 off and turns off at time t2 after lapse of the time period for disconnection.

Power converter 2 converts DC voltage VB of battery 6 into AC voltage VO in accordance with the command from controller 35 and provides the AC voltage to output terminal T2. This AC voltage VO is supplied to load 5, and transmitted to input terminal T1 through a plurality of snubber circuits 23 (FIG. 6) included in bypass circuit 1 and vacuum circuit breakers S1 and S2 and detected by voltage detector 30 as AC voltage VI, and failure detection signal φ33 is set to the "H" level which is the non-activated level (time t1 to t2).

When recovery detector 34 determines whether or not commercial AC power supply 4 has recovered based on output signal φ30 from voltage detector 30 within this period (time t1 to t2), it erroneously recognizes that the commercial AC power supply has recovered although it has not yet actually recovered. Then, recovery detector 34 in the present embodiment withholds determination as to whether or not the commercial AC power supply has recovered for a period until lapse of prescribed time period Td since power failure (time t1 to t3), and starts determination as to whether or not the commercial AC power supply has recovered at time t3 after lapse of prescribed time period Td since power failure (time t1). Since this prescribed time period Td is longer than the time period for disconnection of vacuum circuit breaker S1, vacuum circuit breaker S1 will have been turned off by time t3.

As vacuum circuit breaker S1 is turned off (time t2), AC output voltage VO of power converter 2 is not transmitted to input terminal T1, AC voltage VI lowers to a small value, and failure detection signal φ33 is set to the "L" level which is the activated level. Determination as to recovery by recovery detector 33 is resumed at time t3, and recovery detection signal φ34 is maintained at the "L" level which is the non-activated level.

When commercial AC power supply 4 recovers at time t4, AC voltage VI supplied from commercial AC power supply 4 increases to a large value. As AC voltage VI increases to the large value, failure detection signal φ33 is set to the "H" level which is the non-activated level and recovery detection signal φ34 is set to the "H" level which is the activated level.

When recovery detection signal φ34 is set to the "H" level, controller 35 controls power converter 2 such that AC voltage VO is in phase with AC voltage VI. When AC voltages VO and VI are in phase with each other, controller 35 turns off bypass circuit 1 and provides on command signal S1 on (FIG. 2) to vacuum circuit breaker S1. When vacuum circuit breaker S1 is turned on (time t5), AC power is supplied from commercial AC power supply 4 through vacuum circuit breakers S1 and S2 and bypass circuit 1 to load 5. Controller 35 controls power converter 2 to perform an AC-DC conversion operation.

As set forth above, in this embodiment, since bypass circuit 1 is composed of semiconductor switch 22 including IGBTs Q1 and Q2 and diodes D1 and D2, bypass circuit 1 can more quickly be disconnected and commercial AC power supply 4 and load 5 can more quickly be disconnected from each other on the occurrence of power failure of commercial AC power supply 4 than in an example where the bypass circuit is composed of a pair of thyristors.

Two vacuum circuit breakers S1 and S2 are connected in series between input terminal T1 and one terminal 1a of bypass circuit 1. When commercial AC power supply 4 is normal, two vacuum circuit breakers S1 and S2 are both turned on. When commercial AC power supply 4 fails, a vacuum circuit breaker (S2 in this case) different from a vacuum circuit breaker (for example, S1) turned off on the occurrence of previous power failure is turned off. Therefore, an AC output voltage of power converter 2 can be prevented from appearing at input terminal T1 through bypass circuit 1 on the occurrence of commercial AC power supply 4 and a malfunction of the uninterruptible power supply can be prevented.

Furthermore, since whether or not commercial AC power supply 4 has recovered is determined after lapse of prescribed time period Td (FIG. 8) since occurrence of power failure of commercial AC power supply 4, detection of an AC voltage supplied from power converter 2 through bypass circuit 1 and vacuum circuit breakers S2 and S1 and resultant erroneous determination as recovery can be prevented.

Rather than the vacuum circuit breaker (for example, S1) turned off and on on the occurrence of previous power failure and recovery, the vacuum circuit breaker (S2 in this example) in which energy has already been stored in spring 19 is turned off. Therefore, vacuum circuit breakers S1 and S2 can quickly be turned on upon recovery of commercial AC power supply 4. Since inexpensive vacuum circuit breakers S1 and S2 are employed rather than an expensive high-speed mechanical switch, an apparatus can be low in cost. Therefore, the uninterruptible power supply which is inexpensive and operates fast in a stable manner can be realized.

In this embodiment, two vacuum circuit breakers S1 and S2 are connected in series between input terminal T1 and one terminal 1a of bypass circuit 1. Without being limited as such, N (N being an integer not smaller than three) vacuum circuit breakers may be connected in series between input terminal T1 and one terminal 1a of bypass circuit 1. In this case, when power failure and recovery occur N times, N vacuum circuit breakers should only sequentially be turned off and on one by one.

Figure 9:
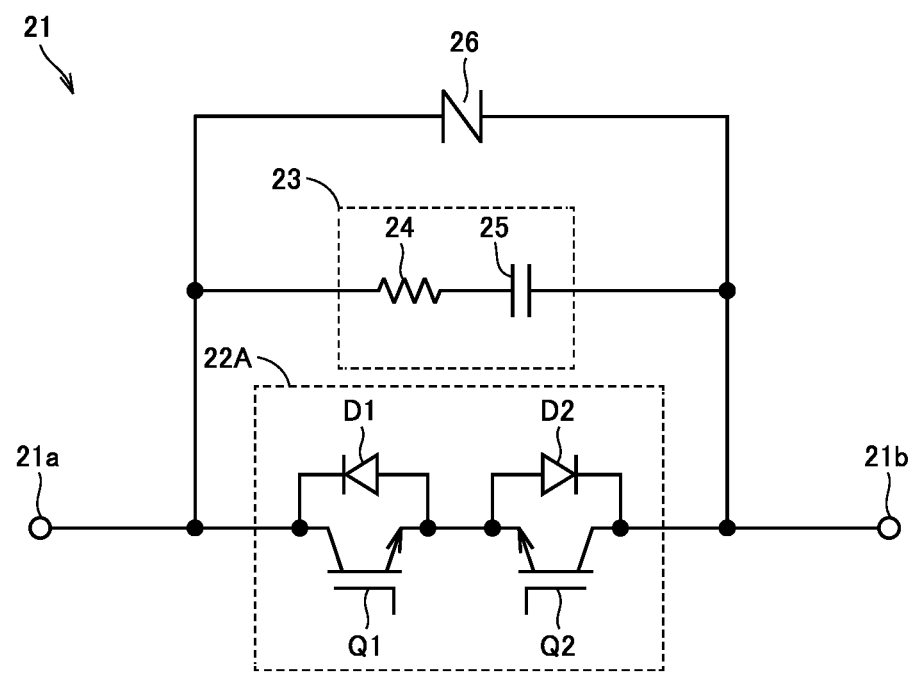
FIG. 9 is a circuit diagram showing a modification of the embodiment.

FIG. 9 is a circuit diagram that shows a modification of the embodiment and is to be compared with FIG. 6. Referring to FIG. 9, this modification is different from the embodiment in that semiconductor switch 22 is replaced with a semiconductor switch 22A. Semiconductor switch 22A includes IGBTs Q1 and Q2 and diodes D1 and D2. IGBTs Q1 and Q2 have emitters connected to each other and collectors connected to terminals 21a and 21b, respectively. Diodes D1 and D2 are connected in anti-parallel to IGBTs Q1 and Q2, respectively. Control device 3 controls on and off of each of IGBTs Q1 and Q2.

When commercial AC power supply 4 is normal, while AC voltage VI supplied from commercial AC power supply 4 is positive, IGBTs Q1 and Q2 have the gates set to the "H" level and the "L" level, respectively. IGBTs Q1 and Q2 are thus set to the on state and the off state, respectively, and a current flows from one terminal 21a through IGBT Q1 and diode D2 to the other terminal 21b.

When commercial AC power supply 4 is normal, while AC voltage VI supplied from commercial AC power supply 4 is negative, IGBTs Q1 and Q2 have the gates set to the "L" level and the "H" level, respectively. IGBTs Q1 and Q2 are thus set to the off state and the on state, respectively, and a current flows from the other terminal 21b through IGBT Q2 and diode D1 to one terminal 21a. Therefore, when commercial AC power supply 4 is normal, semiconductor switch 22A is turned on.

When commercial AC power supply 4 fails, IGBTs Q1 and Q2 have the gates both set to the "L" level and they are both turned off. Therefore, when commercial AC power supply 4 fails, semiconductor switch 22A is turned off.

This modification also achieves an effect the same as in the embodiment. Since the modification is otherwise the same in configuration and operations as the embodiment, description thereof will not be repeated.

It should be understood that the embodiment disclosed herein is illustrative and non-restrictive in every respect. The present invention is defined by the terms of the claims rather than the description above and is intended to include any modifications within the scope and meaning equivalent to the terms of the claims.

REFERENCE SIGNS LIST

T1 input terminal; T2 output terminal; T3 battery terminal; S1, S2 vacuum circuit breaker; 1 bypass circuit; 2 power converter; 3 control device; 4 commercial AC power supply; 5 load; 6 battery; 10 vacuum valve; 11, 12 electrode; 13, 14 conductor; 15, 16 external terminal; 17 operation rod; 18 operation mechanism portion; 19 spring; 20 driver; 21 AC switch; 22, 22A semiconductor switch; 23 snubber circuit; 24 resistive element; 25 capacitor; 26 varistor; Q1, Q2 IGBT; D1, D2 diode; 30 to 32 voltage detector; 33 failure detector; 34 recovery detector; 35 controller

The invention claimed is:

1. A power supply apparatus comprising:
    an input terminal that receives AC power supplied from an AC power supply;
    an output terminal connected to a load;
    a plurality of mechanical switches and a bypass circuit connected in series between the input terminal and the output terminal;
    a control device that (i) turns on both of the plurality of mechanical switches and the bypass circuit when the AC power supply is normal, and (ii) turns off a mechanical switch different from a mechanical switch turned off on occurrence of previous power failure of the plurality of mechanical switches and turns off the bypass circuit when the AC power supply fails; and
    a power converter that converts DC power supplied from a DC power supply into AC power and provides the AC power to the output terminal when the AC power supply fails.

2. The power supply apparatus according to claim 1, wherein
    the mechanical switches are each a vacuum circuit breaker.

3. The power supply apparatus according to claim 2, wherein
    the vacuum circuit breaker includes
        a pair of electrodes,
        a spring,
        a driver that has energy stored in the spring, and
        an operation mechanism portion that (i) moves the pair of electrodes away from each other when the vacuum circuit breaker is turned off, and (ii) brings the pair of electrodes into contact with each other by using release force of the spring when the vacuum circuit breaker is turned on.

4. The power supply apparatus according to claim 1, wherein
    the bypass circuit includes a semiconductor switch and a snubber circuit connected in parallel to each other.

5. The power supply apparatus according to claim 4, wherein
    the semiconductor switch includes first and second terminals, first and second transistors, and first and second diodes,
    the first and second transistors have first electrodes connected to each other,
    the first and second transistors have second electrodes connected to the first and second terminals, respectively,
    the first and second diodes are connected in anti-parallel to the first and second transistors, respectively, and
    the snubber circuit is connected between the first and second terminals.

6. The power supply apparatus according to claim 4, wherein
    the snubber circuit includes a resistive element and a capacitor connected in series.

7. The power supply apparatus according to claim 1, wherein
    the control device includes
        a voltage detector that detects an AC voltage of the input terminal,
        a failure detector that provides a failure detection signal when the AC voltage detected by the voltage detector is not within a normal range,
        a recovery detector that provides a recovery detection signal when a predetermined time period has elapsed since output of the failure detection signal from the failure detector in response to the AC voltage detected by the voltage detector being within the normal range, and
        a controller that (i) turns off the mechanical switch different from the mechanical switch turned off on the occurrence of the previous power failure of the plurality of mechanical switches and turns off the bypass circuit in response to the failure detection signal, and (ii) turns on both of the plurality of mechanical switches and the bypass circuit in response to the recovery detection signal, and
    the predetermined time period is longer than a time period for disconnection of the mechanical switch.

8. The power supply apparatus according to claim 1, wherein
    the DC power supply includes a power storage device in which DC power is stored, and
    the power converter (i) converts AC power supplied from the AC power supply through the plurality of mechanical switches and the bypass circuit into DC power and has the DC power stored in the power storage device when the AC power supply is normal, and (ii) converts DC power in the power storage device into AC power and provides the AC power to the output terminal when the AC power supply fails.

* * * * *